United States Patent
Mueller et al.

(10) Patent No.: US 6,359,421 B1
(45) Date of Patent: Mar. 19, 2002

(54) METHOD FOR THE OPTIMIZED CONTROL IN TERMS OF OUTPUT AND EFFICIENCY OF SYNCHRONOUS MACHINES

(75) Inventors: Wolfgang Mueller, Stuttgart; Oliver Luz, Lichtenwald; Richard Schoettle, Oelbronn, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,593

(22) PCT Filed: Oct. 27, 1999

(86) PCT No.: PCT/DE99/03416

§ 371 Date: Aug. 11, 2000

§ 102(e) Date: Aug. 11, 2000

(87) PCT Pub. No.: WO00/27023

PCT Pub. Date: May 11, 2000

(30) Foreign Application Priority Data

Oct. 29, 1998 (DE) .......................................... 198 49 889

(51) Int. Cl.⁷ .............................................. H02P 9/10
(52) U.S. Cl. ........................................... 322/20; 322/36
(58) Field of Search ............................... 290/40 B, 40 E; 322/19, 20, 27, 22, 28, 29, 36

(56) References Cited

U.S. PATENT DOCUMENTS

| | | | |
|---|---|---|---|
| 3,908,130 A | * 9/1975 | Lafuze | 290/46 |
| 4,449,086 A | * 5/1984 | Hoffmann et al. | 318/696 |
| 4,816,736 A | * 3/1989 | Dougherty et al. | 320/17 |
| 5,144,178 A | 9/1992 | Sugiura | 310/114 |
| 5,648,705 A | 7/1997 | Sitar | 318/145 |
| 5,663,631 A | 9/1997 | Kajiura | 322/29 |
| 6,181,112 B1 | * 1/2001 | Latos et al. | 322/59 |
| 6,300,746 B1 | * 10/2001 | Mueller et al. | 322/29 |

FOREIGN PATENT DOCUMENTS

| | | |
|---|---|---|
| DE | 197 33 212 A1 | 2/1999 |
| DE | 197 33 221 A1 | 2/1999 |
| EP | 0 693 816 A | 1/1996 |
| EP | 0 717 490 A | 6/1996 |
| EP | 0 762 596 A1 | 3/1997 |

* cited by examiner

*Primary Examiner*—Nicholas Ponomarenko
(74) *Attorney, Agent, or Firm*—Michael J. Striker

(57) ABSTRACT

A method for optimized power and efficiency regulation of rotary current generators with an associated converter bridge, in particular synchronous machines, is described in which at least three regulation ranges are defined, within which ranges the regulation of the generator takes place by different criteria. The definition of the regulation ranges is done in particular as a function of rpm and as a function of the desired set-point power. The regulation extends both to the exciter current and to the stator current and is done by means of various regulators that exchange information with one another.

10 Claims, 3 Drawing Sheets

METHOD FOR THE OPTIMIZED CONTROL IN TERMS OF OUTPUT AND EFFICIENCY OF SYNCHRONOUS MACHINES

Figure 1:
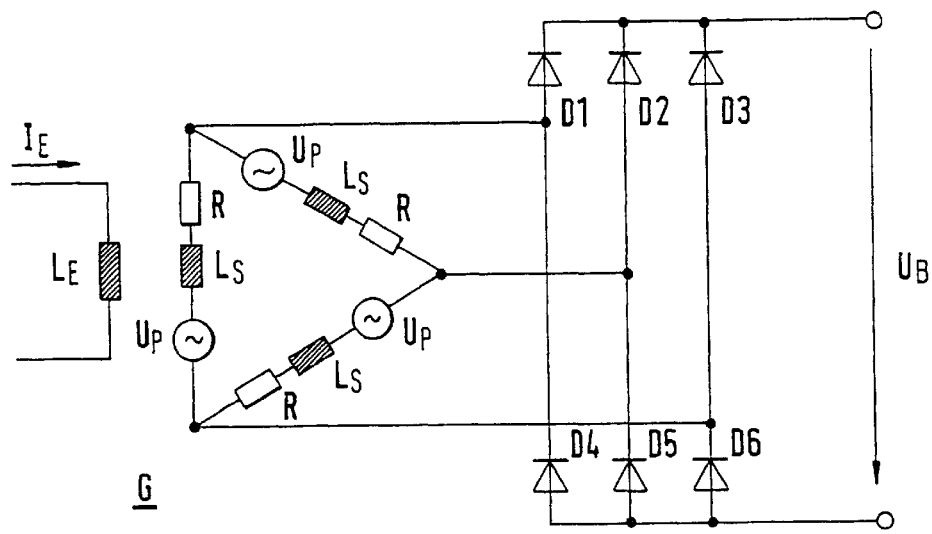

In the motor vehicle, claw pole generators are predominantly employed at present to generate energy. Claw pole generators are rotary current machines, which can be described approximately by the principle of the synchronous salient pole machine. Typically, the three-phase output current of the generator is rectified by a passive B6 diode bridge; FIG. 1 shows such an arrangement. The generator is regulated by the exciter current such that the output voltage $U_B$ of the generator is set to the desired value independently of the rpm and, within the context of the power handling capacity of the generator, also independently of the load. With a generator and the associated rectifier circuit as shown in FIG. 1, the power does not begin to be produced until after a certain rpm, the so-called startup rpm, is reached. At rpm levels less than the startup rpm, the generator voltage is lower than the battery voltage. In that case, no power can be fed into the on-board electrical system via the B6 rectifier bridge.

One possibility of increasing the power of a claw pole generator is to increase the exciter current. Given the usual machine designs for the claw pole generators employed in the motor vehicle, however, this leads to pronounced magnetic saturation phenomena. These saturation phenomena can reduce the power increase substantially. Furthermore, a marked increase in the exciter current during continuous operation leads to a thermal overload on the generator, so that this method can be employed for only a limited time.

Another point of departure for increase in power is to vary the number of stator windings. Increasing the number of stator windings leads to a reduction in the startup rpm and to an increase in the outset power in the low rpm range. However, in that case, the outset power in the middle and high rpm range is reduced markedly. Reducing the number of stator windings does lead to a power increase in the high rpm range, but at the same time the power in the lower rpm range is reduced, and the startup rpm is increased. For these reasons, varying the number of stator windings does not lead to the goal of increasing power over a wide rpm range.

In German Patent Application DE-P 197 33 221.8, it is shown how the power characteristic of the generator can be varied in an advantageous way, with the aid of a high-level setting controller or low-level setting controller connected downstream of the generator and by varying the numbers of stator windings. If, as described in German Patent Application DE-P 198 45 569.0, then number of stator windings is reduced and a high-level setting controller is connected downstream of the generator with a diode rectifier, the result is an increase in power in the middle and high rpm range. In the low rpm range, the voltage of the generator is raised to the voltage level of the on-board electrical system, with the aid of the high-level setting controller.

A substantial disadvantage of rectification of the three-phase generator currents with the aid of a passive B6 bridge is that the amount and phase of the phase current or the pole wheel angle cannot be used as a controlling variable for regulating the generator. In that case, the star voltage is fixedly predetermined by the on-board electrical system voltage, and the phase angle between the phase current and the star voltage is, with good approximation, $\phi=0$ at all operating points. The machine can therefore not be guided optimally in all operating points with regard to the outset power, efficiency and regulation dynamics.

If the generator is operated together with a pulse inverter, this limitation no longer exists. References are also known that address the use of a claw pole generator in conjunction with a pulse inverter.

In German Patent Application DE-P 197 33 212.9, a method for regulating a generator that can be driven by an internal combustion engine is described. This reference indicates the possibility of using two regulation ranges, that is, the basic rpm range at low rpm and the field attenuation range at higher rpm. No regulating method is described. The regulation of the exciter current is not mentioned. The lack of inclusion of the exciter current, however, leads to machine or generator guidance that is not optimized in terms of efficiency and power.

U.S. Pat. No. 5,648,705 or European Patent Disclosure EP 0 762 596 A1 describes a method in which the power enhancement in the lower rpm range by varying the angle between the stator current and the pole wheel voltage is addressed. A well-developed regulation concept is not described. If maximum outset power is not needed in the low rpm range, then the three-phase current of the generator is set to the desired output voltage, with the aid of a passive diode bridge and with regulation solely of the exciter current. For the passive diode bridge, the parasitic diodes of the MOSFET switches of the current inverter circuit are used. However, regulation in the middle and higher rpm ranges is not discussed. Optimal machine guidance in terms of power and efficiency in the middle and higher rpm range at full and partial load is therefore not achieved.

In U.S. Pat. No. 5,663,631, a generator regulation is described in which the exciter current $I_E$ of the machine is ascertained by a regulator, solely with the aid of the difference $\Delta U_B = U_{Bsoll} - U_{Bist}$ between the set-point value $U_{Bsoll}$ and the actual value $U_{Bist}$ of the outset direct voltage. The pole wheel angle $\delta$ of the machine is set for maximum outset power to $\delta=90°$. At the same time, the possibility is mentioned of operating the machine at an operating point that is optimized for the sake of efficiency by means of a suitable choice of the pole wheel angle. Mention is made of the fact that the precise setting of the pole wheel angle can be done as a function of the exciter current. There is no description of the way in which the pole wheel angle has to be varied precisely as a function of the exciter current.

An essential definitive characteristic of this method is that determining the exciter current is dependent only on the regulation difference $\Delta U_B$. A correction of the pole wheel angle, which is mentioned in the patent, is done only as a function of the exciter current.

In contrast to the known method, in the claims methods are defined that for each rpm point and each desired generator power can select the exciter current and the phase current freely in terms of amount and phase. This opens up the possibility of selecting the most suitable operating state for current requirements, from among all the possible operating states of the machine or generator, and accordingly setting the operating point of whatever is most favorable for the demands made. In the present patent application, the desired outset power influences not only the set-point value of the exciter current but also directly influences all the control parameters of the machine that are relevant to guiding the machine.

The method known from U.S. Pat. No. 5,663,631 has the additional disadvantage, compared with the present patent application, that the regulation dynamics are determined by the exciter circuit. With respect to its behavior in the event of major load changes, it therefore has the same disadvantage as rectification with a passive B6 diode bridge. Thus load changes are regulated dynamically only in accordance with the high exciter time constants. In the present patent application, however, the amount and phase relationship of the phase currents are additionally utilized for the sake of dynamic high-quality regulation of major load changes.

ADVANTAGES OF THE INVENTION

The method and apparatuses of the invention for regulating a generator have the advantage that both the available outset power and the efficiency of the generator can be increased substantially over a wide rpm range, compared to a generator with passive diode rectification.

In addition, by the method described, a marked improvement in regulation dynamics is attained, for instance in the event of a load dump. In modern generators, the protection against overvoltages upon a load dump is done with the aid of the rectifier diodes, embodied as Zener diodes. If the generator is intended to generate a relatively high on-board electrical system voltage, such as $U_B$=42 V, then considerable problems arise in manufacturing Zener diodes with relatively high voltage. To achieve protection against overvoltages upon a load dump even at higher generator voltages, such as $U_B$=42 V, other methods for voltage limitation must therefore be chosen. The method presented here advantageously combines the increase in power and efficiency of the generator with an effective protection against overloads upon a load dump.

These advantages are attained by a method which comprises a total of four different regulation ranges for regulating the generator. One of the four regulation ranges is selected, depending on the given demands and peripheral conditions, such as the desired outset power and the given generator rpm. In this way, compared to operation with passive rectification, a substantially more favorable machine guidance is possible, which leads to an increase in the available outset power, in the efficiency, and in the regulation dynamics.

The methods claims are advantageously usable for both synchronous full-pole and synchronous salient pole machines and in generators that are based on similar functional principles, such as claw pole generators. The phase windings of the machine can be wired both in a Y-type circuit and in a delta-type circuit. A method is described, taking an idealized synchronous salient pole machine as an example. In machines that have similar functional principles or that have non-negligible additional effects, such as a pronounced non-linear magnetic behavior, the described method can be employed with the aid of similar considerations.

Further advantages of the invention are attained by the provisions recited in the dependent claims.

DRAWING

One exemplary embodiment of the invention is shown in the drawing and will be described in further detail below.

DESCRIPTION

In FIG. 1, the components of a generator G with passive rectification that are essential to comprehension of the invention are shown. FIG. 1 shows the currently conventional method in the motor vehicle of generating direct current with the aid of a claw pole generator and a diode bridge. $L_E$ designates the inductance of the exciter winding, and $I_E$ designates the exciter current. $L_S$ designates the stator or phase inductances. $U_P$ symbolizes the pole wheel voltage, and R stands for the resistance of the windings. The diodes of the diode bridge are designated as D1–D6, and $U_B$ is the on-board electrical system voltage or battery voltage.

Figure 2:
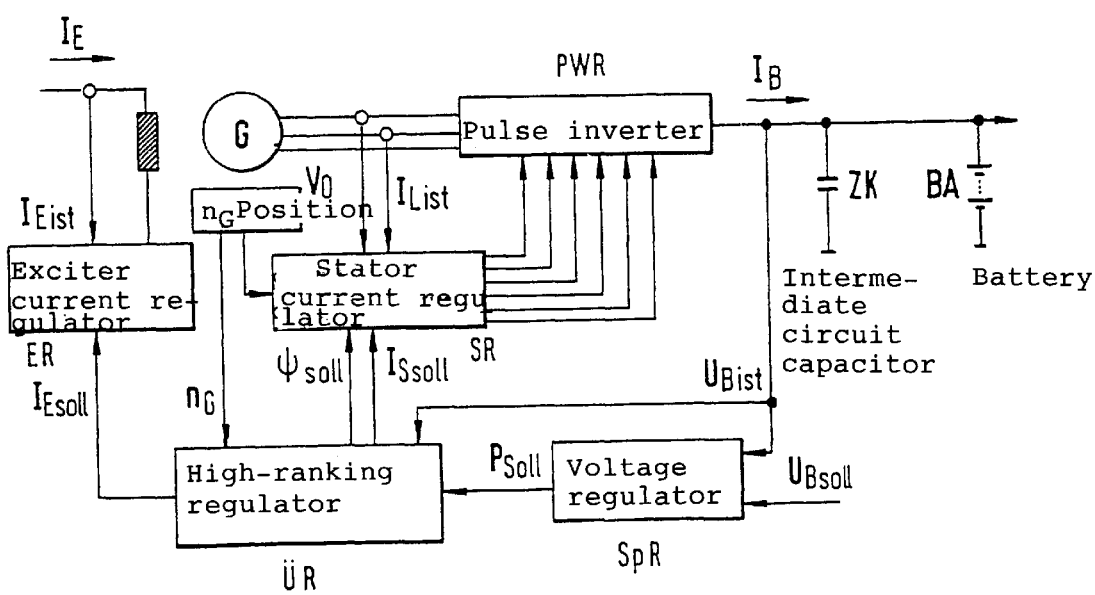

The basic layout of the overall system is shown in FIG. 2. The generator leads via pulse inverter elements PWR to an intermediate circuit capacitor ZK and to the battery BA. An apparatus VO ascertains the generator rpm $n_G$ and the rotor position. The individual regulators are designated as ER (for exciter current regulator), SR (for stator current regulator), ÜR (for higher-ranking regulator), and SpR (for voltage regulator). The other variables included in FIG. 2 will be explained later in this description.

The desired set-point power of the generator $P_{Soll}$ is ascertained by a voltage regulator, such as a PI regulator, with the aid of the standard deviation between the set-point and actual values of the battery voltage, $U_{BSoll}$–$U_{Bist}$. An apparatus for detecting the position and rpm ascertains the rotor position and the generator rpm. The methods for position and rpm detection can be based for instance on optical, magnetic or mechanical principles. Sensorless methods also exist, which ascertain the position of the rotor and its rpm from the terminal values of the machine. These methods are known and will therefore not be described further here.

The input variables for the higher-ranking regulator are the desired generator power $P_{Soll}$, the rpm $n_G$, and the intermediate circuit voltage $U_{Bist}$. One of four regulation ranges is chosen selectively by the higher-ranking regulator. The set-point values output by the higher-ranking regulator are, as defined in FIG. 2, the amount $IS_{Soll}$ and the phase relationship $\Psi_{Soll}$ of the phase current, and the longitudinal and transverse components of the phase current $I_{dSoll}$, $I_{qSoll}$, and the set-point value of the exciter current, $I_{ESoll}$. As a result, for each rpm point and each generator power demanded by the voltage regulator, whatever is the most favorable operating point can be selected freely.

The input variables of the stator current regulator are the rotor position and the generator rpm $n_G$, the set-point values of the phase currents, and the measured conductor currents $I_{List1}$ and $I_{List2}$. From the two conductor currents measured, the phase currents of the generator can be ascertained by computation. Alternatively, all three conductor currents, or two or three phase currents, can also be measured directly.

Figure 5:
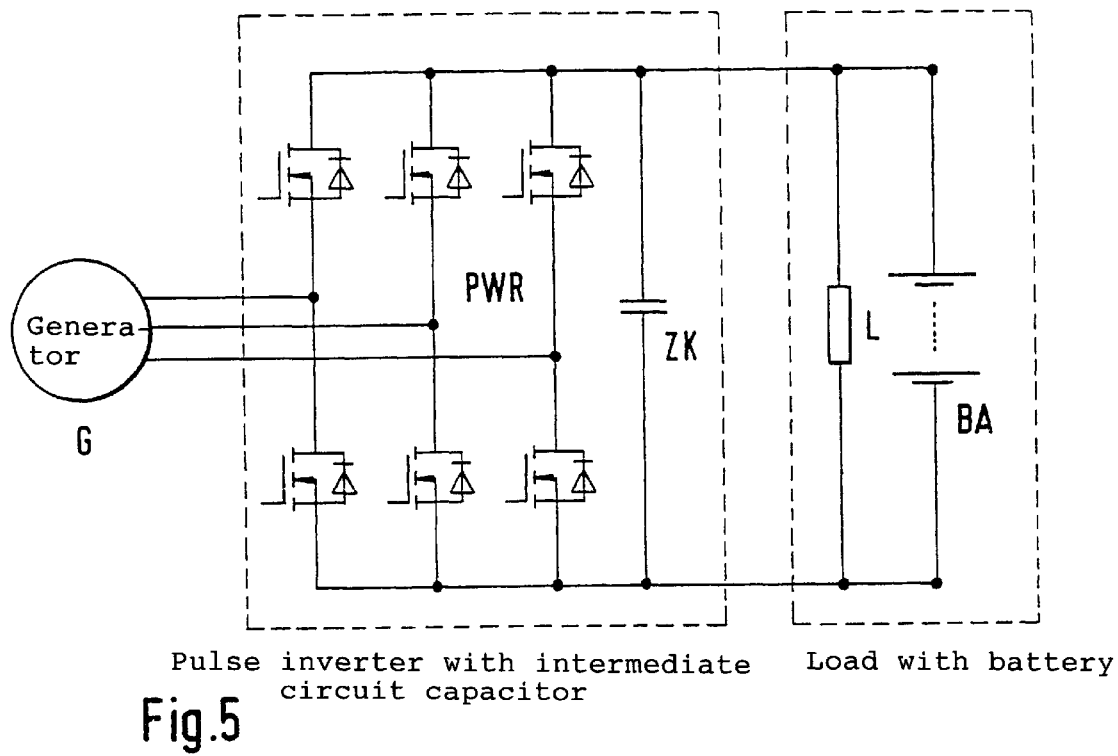

The stator current regulator controls the six switches of the pulse inverter (FIG. 5) in a suitable way, in order to impress the phase current in terms of amount and phase. The switches of the pulse inverter can for instance be embodied as MOSFET transistors, as shown in FIG. 5. The many possible methods of impressing phase currents by amount and phase with the aid of a pulse inverter in a rotary current machine are well known and will therefore not be described further here.

Figure 3:
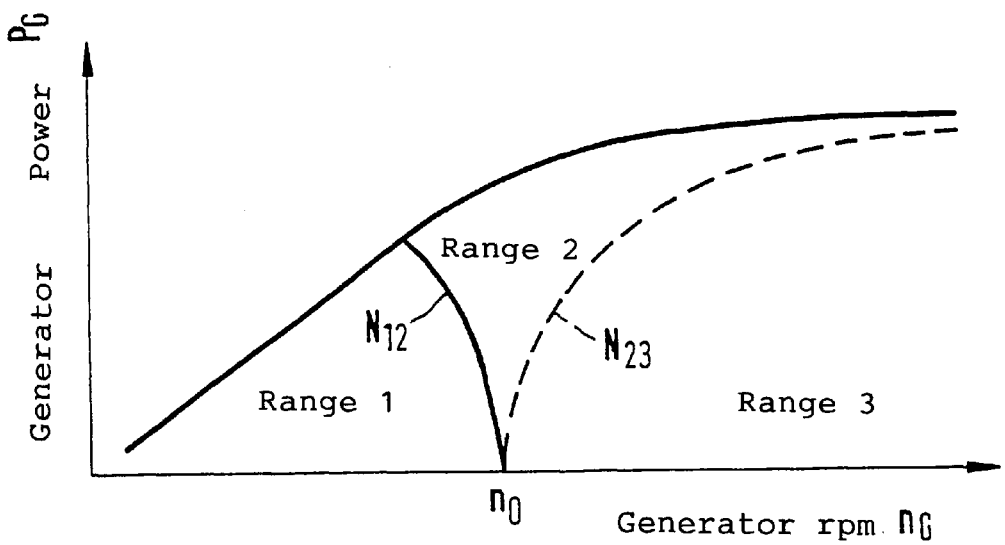

The basic course of the regulation ranges 1–3 is shown in FIG. 3 as a function of the outset power $P_{GEN}$ and the generator rpm $n_G$.

In operation with rpm values that are to the left of the rpm line $N_{23}$, no power can be drawn in operation with a passive B6 bridge, since the output voltage of the generator in that case is less than the on-board electrical system voltage $U_B$. The rpm line $N_{23}$ corresponds to full-load operation of the generator with a passive B6 bridge. With the aid of the regulation ranges 1 and 2, the generator can also generate power in very low rpm ranges. The startup rpm $n_0$ that is important in passive rectification is thus no longer of significance, with the aid of the method of the invention.

Figure 6:
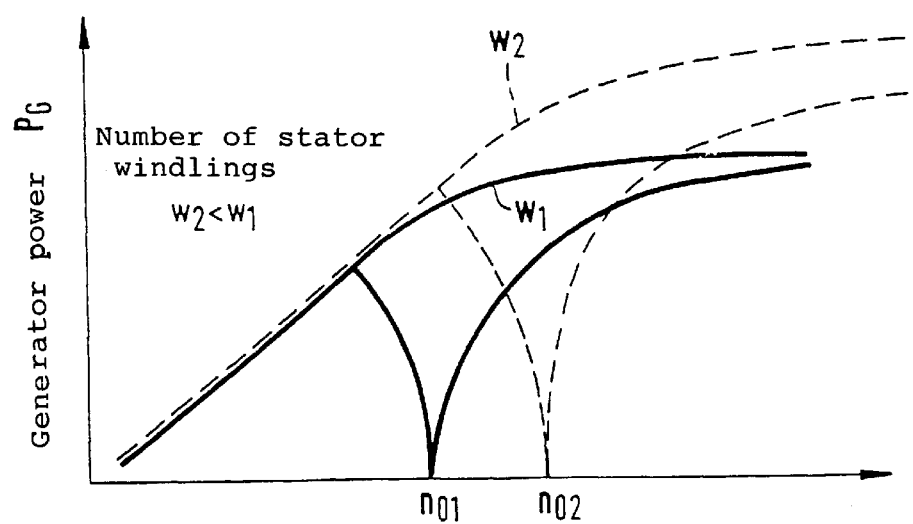

FIG. 6 shows how the power characteristic of the generator varies upon variation of the number of stator windings. If the number of stator windings is reduced from w1 to w2, then the power rises at high rpm levels. The limit lines $N_{12}$ and $N_{23}$ are shifted toward higher rpms. The maximum outset power attainable in a very low rpm range remains constant, however. In range 1, regardless of the number of stator windings, its course is on the same straight line.

The regulation ranges 1–3 also represent ranges of different efficiency. By varying the number of stator windings, both the power and efficiency behavior can therefore be adapted to the load characteristic curve. For example, this can be attained by covering the idling rpm of the motor vehicle with the optimized-efficiency regulation range 1.

Regulating Range 1

The lower rpm range of the generator is covered by regulation range 1. In this regulation range, the exciter current $I_E$ is set to its maximum possible value; that is, $I_E = I_{Emax}$. This maximizes the pole wheel voltage in the lower rpm range. Because of the low rpm, the star voltage $U_S$ is always so slight in comparison with the on-board electrical system voltage $U_B$ that the voltage adjustment range of the pulse inverter $U_{max}$ in regulation range 1 is not exceeded. The star voltage $U_S$ is therefore always less than the maximum value $U_{max}$ that can be set by the pulse inverter. The phase relationship and the amount of the phase currents can therefore be set to a maximum outset power of the machine without restriction. The maximum possible phase current is restricted only by heating of the machine. At a constant phase current $I_S$, the maximum outset power of the machine increases proportionally to the rpm in regulation range 1.

Figure 4:
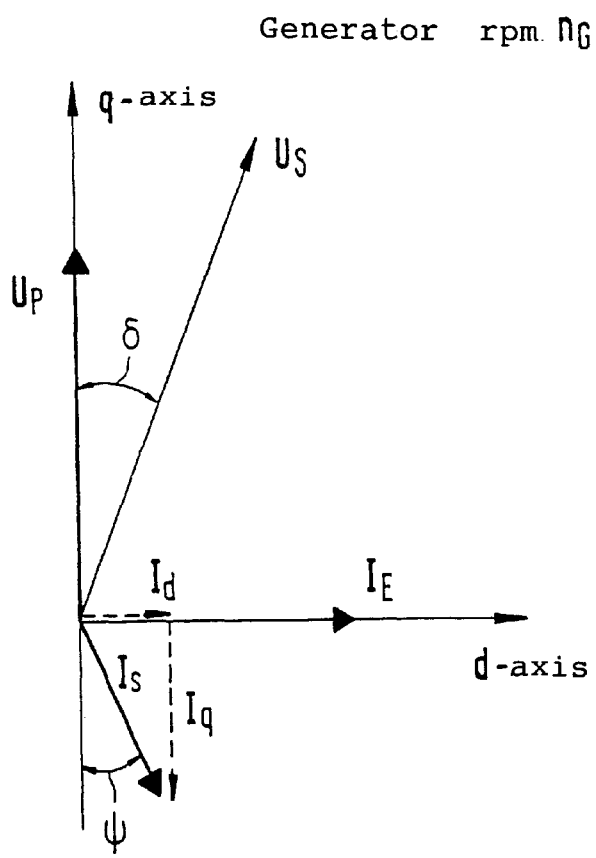

With the angle $\Psi$ defined in FIG. 4, and with the longitudinal and transverse currents $I_d$ and $I_q$, where $$I_d = I_S \cdot \sin \Psi \quad I_q = I_s \cdot \cos \Psi$$

The equation for the outset power of a synchronous salient pole machine is as follows:

$$P_{GEN} = \tfrac{3}{2} \cdot \omega \cdot \{ (M_{de} \cdot I_{Emax} \cdot I_S \cos(\Psi) + \tfrac{1}{2} \cdot (L_d - L_q) \cdot I_S^2 \cdot \sin(2\Psi) \}$$

where $\omega$ stands for the electrical circuit frequency of the phase currents, and $M_{de}$ stands for the coupling inductance between the rotor and the stator.

From the above equation $I_S = I_S(P_{GEN}, \Psi)$, an optimal angle $\Psi_{opt}$ for a desired set-point power of the generator $P_{GEN}$ can be ascertained at which the phase current assumes a minimum value.

If $$A = \frac{L_d - L_q}{2}, \quad B = M_{de} \cdot I_{Emax}, \quad C = \frac{2 \cdot P_{Soll}}{3 \cdot \omega}$$

then approximately $$\Psi_{opt} = \arctan\left( \frac{1}{4} \cdot \left( \frac{B^2}{2 \cdot A \cdot C} + \sqrt{\left( \frac{B^2}{2 \cdot A \cdot C} \right)^2 + 8} \right) \right) \quad \text{and}$$

$$I_{S\min} = \frac{B \cdot \sin\psi}{2 \cdot A \cdot \cos(2\psi)}$$

Thus minimizing the phase current by setting an is optimal angle $\Psi_{opt}$ for a desired set-point $P_{GEN}$, for a maximum possible exciter current $I_E = I_{Emax}$, leads to minimized ohmic phase losses. Since the electrical ohmic losses in the phase windings are always, except at very low power levels, substantially greater than the electrical losses in the exciter circuit, the machine operates at maximum efficiency in regulation range 1.

Beyond a specific, power-dependent rpm, characterized in FIG. 3 by the rpm line $N_{12}$, the phase relationship of the phase currents can no longer be set by the pulse inverter in accordance with the strategy of regulation range 1. In this case, the star voltage exceeds the maximum value, dictated by the intermediate circuit voltage $U_{Bisr}$ of the voltage adjusting range $U_{max}$ of the pulse inverter. This leads to a second regulation range, that is, regulation range 2, in which the star voltage has to be limited to its possible maximum value by suitable machine guidance.

Regulation Range 2

In regulation range 2, $I_E = I_{Emax}$ continues to be set. Now, however, the phase relationship of the phase current is selected such that the star voltage assumes the maximum value that can be set by the pulse inverter, that is, $U_S = U_{max}$. The phase relationship of the phase current is selected such that by an attenuation of the air gap field, the voltage adjusting range $U_{max}$ of the pulse inverter is not exceeded.

With the pole wheel angled and a constant star voltage $U_S = U_{max}$, the outset power of the generator becomes:

$$P_{Soll} = -\frac{3}{2} \cdot U_{max} \cdot \left( \frac{M_{de} \cdot I_{Emax}}{L_d} \cdot \sin(\delta) + \frac{U_{max}}{2 \cdot \omega} \cdot \left( \frac{1}{L_q} - \frac{1}{L_d} \right) \cdot \sin(2\delta) \right)$$

For a given maximum, constant star voltage $U_{max}$, the desired generator power can be set by varying the pole wheel angles. For each desired set-point power, a certain pole wheel angle $\delta = \delta(P_{soll})$ can be set, within the context of the power capacity of the generator.

If the pole wheel angle in the machine is set to delta = delta($P_{soll}$), then the adjusting range of the pulse inverter is not exceeded, and the condition $U_S = U_{max}$ is met.

The longitudinal and transverse currents to be set become $$I_d = \frac{U_{max} \cdot \cos\delta - \omega \cdot M_{de} \cdot I_{Emax}}{\omega \cdot L_d} \quad \text{and}$$

$$I_q = -\frac{U_{max} \cdot \sin\delta}{\omega \cdot L_q}$$

The machine state is unambiguously defined as a function of the desired set-point power $P_{GEN}$ by $I_E$, $I_d$ and $I_q$.

In range 2, the machine receives wattless power $P_B$. As the outset power decreases (partial-load operation), finally $\cos \phi = 1$ is reached; that is, the phase current and star voltage are in-phase. The rpm line $N_{23}$ describes this limit. At even lower power levels, however, it is then appropriate to continue to operate the machine with $\cos \phi = 1$, in order to maximize the efficiency. This is realized by regulation ranges 3.

Regulation Range 3

The regulation range 3 is characterized by operation of the generator with a power factor $\cos \phi = 1$; that is, the phase current and star voltage are in-phase. The regulation range 3 corresponds to operation of the generator with passive diode rectification. This regulation range is set in partial-load operation from the middle rpm range on. For the case in question here of a constant star voltage $U_S = U_{max}$, maximum efficiency of the generator is obtained. To establish this state, the exciter current is regulated such that $\phi = 0$; that is, the wattless power becomes $P_B = 0$. Power levels that are above the limit line $N_{23}$ cannot be generated by regulation range 3, since for this case an exciter current $I_E < E_{max}$ becomes necessary.

The amount of the phase current for regulation range 3 proves to be $$I_S = \frac{2}{3} \cdot \frac{P_{Gen}}{U_{max}}$$

The pole wheel angle delta sought, and the longitudinal and transverse currents $I_d$, $I_q$ and the exciter current $I_E$ are calculated from the machine equations of the salient pole synchronous machine as $$\delta = \arctan\left(\frac{\omega \cdot L_q \cdot I_S}{(R_1 \cdot I_S - U_{max})}\right)$$

$$I_d = I_S \cdot \sin(\delta), \quad I_q = I_S \cdot \cos(\delta)$$

$$I_E = \frac{1}{\omega \cdot M_{de}} \cdot ((U_{max} - R_1 \cdot I_S) \cdot \cos\delta - \omega \cdot L_d \cdot I_S \cdot \sin\delta)$$

The machine guidance for regulation range 3 is thus completely defined.

With the regulation structures described in regulation range 1–3, all the normal operating states of the machine are covered.

Regulation Range 4

The regulation range 4 described below serves on the one hand to assure high regulation dynamics at extreme load dumps. This regulating function furthermore represents an additional safety function against overvoltages.

If $U_{Bist}$ exceeds a settable overvoltage threshold, then the normal pulse inverter operating mode is departed from, and with the aid of the switches of the pulse inverter, the three-phase outputs of the generator are short-circuited. As a result, the overvoltage drops very rapidly. At the same time, the exciter current of the machine is reduced, for example by a fast deexcitation. If the output voltage reaches a settable undervoltage threshold that is located below the set-point value of the output voltage $U_{BSoll}$, then the machine is guided again in accordance with regulation range 1–3.

Realization of the method from the standpoint of regulation:

In principle, it is possible to ascertain the limits between the individual regulation ranges by numerical calculation and to ascertain the exciter current and the longitudinal and transverse currents with the aid of the equations shown. However, this means a very high numerical expense. However, if the entire system is to be realized in the motor vehicle, then only the limited computer capacity of the controllers that can be used in the motor vehicle, for reasons of cost, is available.

One possible way of circumventing this problem resides for instance in a table-oriented method. The higher-ranking regulator has the inputs $P_{soll}$, $n_G$, $U_b$ and the outputs $I_E$, $I_d$ and $I_q$, or $I_S$ and $\Psi$. This dependency can be illustrated with the aid of a multidimensional table. This table contains the equations of the higher-ranking regulator that are calculated off-line. (Regulation range 1–4)

What is claimed is:

1. A method for optimized power and efficiency regulation of a generator with an associated converter bridge, in particular of a synchronous machine, in which the exciter current ($I_E$) flowing through the exciter winding is regulated such that the output voltage of the generator attains a predeterminable level, and that in addition the phase currents of the generator are regulated, characterized in that at least three regulation ranges are formed, in which the regulation of the exciter current and of the phase currents of the generator is done by different criteria.

2. The method of claim 1, characterized in that the formation of the rotational regulation ranges is formed as a function of the outset power ($P_{GEN}$) of the generator and/or as a function of the rpm of the generator ($n_G$).

3. The method of claim 1, characterized in that the regulation is effected such that for each rpm of the generator and each desired generator power, the exciter current and the phase current or phase currents can be selected freely in terms of amount and phase.

4. The method of one claim 1, characterized in that in a first regulation range, the exciter current is set to its maximum possible value; that in a second regulation range, the exciter current is likewise set to its maximum value, but the phase relationship of the phase current is selected such that the star voltage assumes the maximum possible value; and that in a third regulation range the generator is operated such that the phase current and star voltage are in phase, and thus the power factor becomes cos φ=1, and the exciter current is regulated such that an angle of φ=0 results.

5. The method of claim 1, characterized in that in a fourth regulation range, after a predeterminable voltage threshold is exceeded, the generator windings are short-circuited by suitable triggering of the converter elements, and the exciter current is reduced.

6. The method of claim 1, characterized in that the variables $I_{Esoll}$, $I_{dsoll}$ and $I_{qsoll}$ required for the regulation are ascertained with the aid of multidimensional tables.

7. An apparatus for optimized power and efficiency regulation of a generator with an associated converter bridge, in particular of a synchronous machine, having a regulator for regulating the exciter current ($I_E$) flowing through the exciter winding, and a further regulator for regulating the phase currents of the generator, characterized in that a higher-ranking regulator communicates with the other two regulators and specifies the set-point values to them.

8. The apparatus of claim 7, characterized in that a fourth regulator functions as a voltage regulator and compares the voltage output at the converter with a set-point voltage and supplies the higher-ranking regulator with a set-point power.

9. The apparatus of claim 7, characterized in that the converter bridge is a pulse inverter, with a predeterminable number of pulse inverter elements and an intermediate circuit capacitor.

10. The apparatus of claim 1, characterized in that the apparatus is a component of a motor vehicle, and at least one of the regulators includes computation means for performing the regulating operations and/or for communication with a computer that is present in the motor vehicle.

* * * * *